(12) United States Patent
Ding

(10) Patent No.: US 11,256,326 B2
(45) Date of Patent: *Feb. 22, 2022

(54) DISPLAY CONTROL METHOD, DISPLAY CONTROL APPARATUS AND USER EQUIPMENT

(71) Applicant: Beijing Zhigu Rui Tuo Tech Co., Ltd, Beijing (CN)

(72) Inventor: Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 5 days.

This patent is subject to a terminal disclaimer.

(21) Appl. No.: 15/197,687

(22) Filed: Jun. 29, 2016

(65) Prior Publication Data

US 2017/0003742 A1 Jan. 5, 2017

(30) Foreign Application Priority Data

Jun. 30, 2015 (CN) .......................... 201510378187.3

(51) Int. Cl.
*G06F 3/01* (2006.01)
*G09G 5/00* (2006.01)

(52) U.S. Cl.
CPC .............. *G06F 3/013* (2013.01); *G06F 3/012* (2013.01); *G09G 5/00* (2013.01);
(Continued)

(58) Field of Classification Search
CPC ........ G06F 3/013; G06F 3/012; G06F 3/0346; G06F 1/163; G09G 5/00; G02B 27/0172
(Continued)

(56) References Cited

U.S. PATENT DOCUMENTS 9,720,496 B2 * 8/2017 Cancel Olmo ......... G06F 3/013
2006/0126488 A1 6/2006 Kang
(Continued)

FOREIGN PATENT DOCUMENTS

CN 1262479 A 8/2000
CN 101630495 A 1/2010
(Continued)

OTHER PUBLICATIONS

Office Action dated Nov. 30, 2017 for U.S. Appl. No. 15/197,679, 16 pages.
(Continued)

*Primary Examiner* — Fred Tzeng
(74) *Attorney, Agent, or Firm* — Amin, Turocy & Watson, LLP

(57) ABSTRACT

A display control method, a display control apparatus and a user equipment are provided. A method comprises acquiring eye movement information related to that at least one eye of a user gazes a user equipment; and adjusting display of a display content of the user equipment at least according to a non-saccade eye movement part in the eye movement information. A display content of a user equipment can be adjusted according to a non-saccade eye movement part of the user equipment gazed by a user, to enable relative movement between the head of the user and the adjusted display content to disappear or decrease, thus improving the user's reading experience in a scenario of having relative movement with the user equipment.

26 Claims, 10 Drawing Sheets

(52) U.S. Cl.
CPC .............. *G09G 2320/0261* (2013.01); *G09G 2340/0464* (2013.01); *G09G 2354/00* (2013.01)

(58) Field of Classification Search
USPC ........................................................ 345/156
See application file for complete search history.

(56) References Cited

U.S. PATENT DOCUMENTS

| | | | |
|---|---|---|---|
| 2010/0118141 | A1 | 5/2010 | Bouchon-Meunier et al. |
| 2010/0321572 | A1 | 12/2010 | Cornett et al. |
| 2013/0066526 | A1* | 3/2013 | Mondragon ............. G09G 5/00 701/48 |
| 2014/0055339 | A1 | 2/2014 | Stanasolovich et al. |
| 2014/0247286 | A1 | 9/2014 | Chi |
| 2014/0347265 | A1* | 11/2014 | Aimone ............. A61B 5/04842 345/156 |
| 2015/0168722 | A1 | 6/2015 | Cho et al. |
| 2015/0199559 | A1 | 7/2015 | Sztuk et al. |
| 2015/0223683 | A1* | 8/2015 | Davidovics ............ A61B 3/113 351/210 |
| 2016/0005176 | A1* | 1/2016 | Nguyen ................. G06F 3/013 382/103 |
| 2016/0027414 | A1* | 1/2016 | Osterhout .......... G02B 27/0172 345/647 |
| 2016/0062118 | A1* | 3/2016 | Osterhout .......... G02B 27/0172 345/8 |
| 2016/0189351 | A1* | 6/2016 | Holz ........................ G06F 1/163 345/647 |
| 2016/0225192 | A1* | 8/2016 | Jones ..................... G06F 3/012 |
| 2016/0364904 | A1* | 12/2016 | Parker .................... G06F 3/012 |
| 2016/0373648 | A1 | 12/2016 | Tseng et al. |
| 2016/0378181 | A1* | 12/2016 | Nasca ................... G06F 3/0346 345/647 |

FOREIGN PATENT DOCUMENTS

| | | |
|---|---|---|
| CN | 101690165 A | 3/2010 |
| CN | 101754715 A | 6/2010 |
| CN | 101860679 A | 10/2010 |
| CN | 101911176 A | 12/2010 |
| CN | 101930302 A | 12/2010 |
| CN | 102165392 A | 8/2011 |
| CN | 201928352 U | 8/2011 |
| CN | 102214455 A | 10/2011 |
| CN | 101690165 B | 9/2012 |
| CN | 102708843 A | 10/2012 |
| CN | 103123780 A | 5/2013 |
| CN | 103365430 A | 10/2013 |
| CN | 103376892 A | 10/2013 |
| CN | 103384544 A | 11/2013 |
| CN | 103970499 A | 8/2014 |
| CN | 104065880 A | 9/2014 |
| CN | 104320545 A | 1/2015 |
| CN | 104575357 A | 4/2015 |

OTHER PUBLICATIONS

Office Action dated Dec. 15, 2017 for U.S. Appl. No. 15/197,693, 27 pages.
Final Office Action dated Jul. 6, 2018 for U.S. Appl. No. 15/197,679, 15 pages.
Final Office Action dated Apr. 25, 2018 for U.S. Appl. No. 15/197,693, 43 pages.
Chinese Office Action for Chinese Application Serial No. 201510378188.8 dated Jul. 17, 2018, 18 pages (with translation).
Chinese Office Action for Chinese Application Serial No. 201510378187.3 dated Jul. 17, 2018, 15 pages (with translation).
Office Action dated Oct. 9, 2018 for U.S. Appl. No. 15/197,693, 56 pages.
Chinese Office Action for Chinese Application Serial No. 201510378186.9, dated Oct. 24, 2018, 6 pages.
Office Action dated Dec. 7, 2018 for U.S. Appl. No. 15/197,679, 13 pages.
Chi, et al. "Eye Tracking" China Machine Press, Jun. 2011, ISBN 978-7-111-34689.0, 47 pages (with translation).
Chinese Second Office Action for Chinese Application Serial No. CN201510378187.3, dated Apr. 3, 2019, 9 Pages.
Office Action dated May 9, 2019 for U.S. Appl. No. 15/197,693, 86 pages.
Final Office Action dated Jun. 6, 2019 for U.S. Appl. No. 15/197,679, 16 pages.
Chinese Office Action dated May 8, 2019 for Chinese Application No. 201510378188.8, 15 pages (including translation).
Feng, "Eye-movement based Human-Computer interaction" Soochow University Press, Apr. 2010, ISBN 978-7-811-37466.7, 15 pages.
Yuan, et al. "Computer simulation for human-machine engineering", Beihang University Press, Apr. 2005, ISBN 7-81077-607-X, 16 pages.
Office Action dated Aug. 16, 2019 for U.S. Appl. No. 15/197,679, 18 pages.
Final Office Action received for U.S. Appl. No. 15/197,679 dated Jan. 30, 2020, 16 pages.

* cited by examiner

DISPLAY CONTROL METHOD, DISPLAY CONTROL APPARATUS AND USER EQUIPMENT

RELATED APPLICATION

The present application claims the benefit of priority to Chinese Patent Application No. 201510378187.3, filed on Jun. 30, 2015, and entitled "display control method, display control apparatus and user equipment", which application is hereby incorporated into the present application by reference herein in its entirety.

TECHNICAL FIELD

The present application relates to the field of information processing technologies, and, for example, to a display control method, a display control apparatus and a user equipment.

BACKGROUND

During use of a user equipment, especially a portable handheld device, such as a mobile phone, when a user in a moving state such as walking or taking a public vehicle, the user equipment may often move relative to the head of the user due to bumping, thus bringing about some bad experience to the user gazing the user equipment. For example, when a user reads contents displayed on the user equipment moving relative to his/her own head, the user may feel uncomfortable such as tired and dizzy.

SUMMARY

An example, non-limiting objective of one or more example embodiments of the present application is: to provide a display control scheme.

In a first aspect, an example embodiment of the present application provides a display control method, comprising:

acquiring eye movement information related to that at least one eye of a user gazes a user equipment; and adjusting display of a display content of the user equipment at least according to a non-saccade eye movement part in the eye movement information.

In a second aspect, an example embodiment of the present application provides a display control apparatus, comprising:

an eye movement information acquisition module, configured to acquire eye movement information related to that at least one eye of a user gazes a user equipment; and a display adjustment module, configured to adjust display of a display content of the user equipment at least according to a non-saccade eye movement part in the eye movement information.

In a third aspect, an example embodiment of the present application provides a user equipment, the user equipment comprising:

a display, configured for display;

a memory, configured to store a program; and a processor, configured to execute the program stored by the memory, the program causing the processor to perform the following operations of:

acquiring eye movement information related to that at least one eye of a user gazes the user equipment; and adjusting display of a display content of the user equipment at least according to a non-saccade eye movement part in the eye movement information.

In a fourth aspect, an example embodiment of the present application provides a user equipment, the user equipment comprising:

a memory, configured to store a program; and a processor, configured to execute the program stored by the memory, the program causing the processor to perform the following operations of:

acquiring eye movement information related to that at least one eye of a user gazes another user equipment; and adjusting display of a display content of the other user equipment at least according to a non-saccade eye movement part in the eye movement information.

According to at least one example embodiment of the present application, a display content of a user equipment is adjusted according to a non-saccade eye movement part of the user equipment gazed by a user, to enable relative movement between the head of the user and the adjusted display content to disappear or decrease, thus improving the user's reading experience in a scenario of having relative movement with the user equipment.

DETAILED DESCRIPTION

Figure 1:
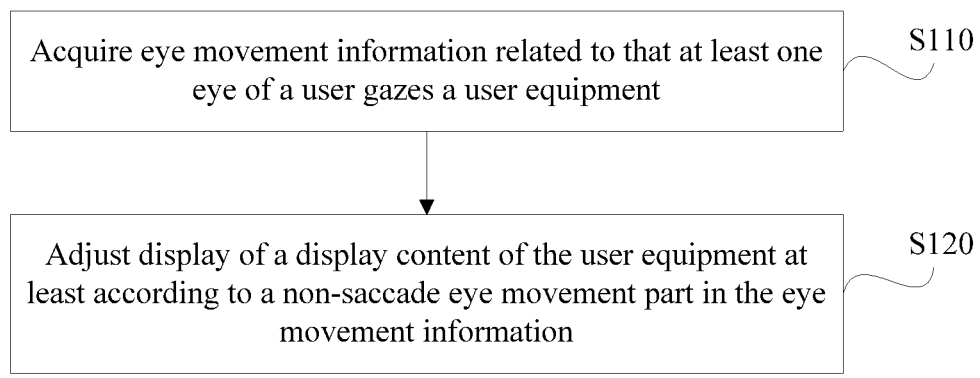
FIG. 1 is a flowchart of a display control method according to an example embodiment of the present application.

Example embodiments of the present application are further described below in detail with reference to the accompanying drawings (in which like elements are denoted by like reference numerals) and description. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

The inventor of the present application finds that, in a process that a user is in a moving state or on an object (e.g., a vehicle) in a moving state, when the user reads display contents on a handheld or wearable user equipment, the user equipment may often move relative to the head of the user due to bumping movement, thus disturbing the reading, for example, the user's eyes get tired easily or the user feels dizzy or the like.

As shown in FIG. 1, one possible example embodiment of the present application provides a display control method, comprising:

S110: acquiring eye movement information related to that at least one eye of a user gazes the user equipment; and S120: adjusting display of a display content of the user equipment at least according to a non-saccade eye movement part in the eye movement information.

For example, the display control apparatus according to the present application is used as an execution body of this embodiment, to perform S110-S120. Specifically, the display control apparatus may be disposed in a user equipment through software, hardware or a combination of software and hardware, or the display control apparatus per se is the user equipment; the user equipment comprises, but is not limited to, a smartphone, a tablet computer, a smart watch, smart frame glasses, a smart helmet and the like.

According to the example embodiment of the present application, a display content of a user equipment is adjusted according to a non-saccade eye movement part of the user equipment gazed by a user, to enable relative movement between the head of the user and the adjusted display content to disappear or decrease, thus improving the user's reading experience in a scenario of having relative movement with the user equipment.

The steps of the embodiment of the present application are further described through the following example embodiment:

S110: Acquire eye movement information related to that at least one eye of a user gazes the user equipment.

Herein, the at least one eye may be one eye of the user; or may also be two eyes of the user.

In one example embodiment, the gazing the user equipment, for example, may be: gazing contents displayed by a display module on the user equipment, for example, reading displayed texts and images; watching displayed video and the like.

In another example embodiment, the gazing the user equipment, for example, may be: gazing physical components on the user equipment.

In one example embodiment, when the user performs an action such as reading, in addition to shaking caused by the above bumping, the head has no other active actions (e.g., rotate), at this point, the eye movement information comprises first movement information related to movement of the at least one eye in a corresponding eye socket.

In another example embodiment, the head of the user may also actively perform other actions, at this point, in addition to the first movement information, the eye movement information may further comprise second movement information related to movement of the head of the user.

In one example embodiment, optionally, S110 may comprise: capture the eye movement information through an eye movement information capturing module.

In one example embodiment, the eye movement information capturing module, for example, may be an image capturing module towards the user's eyes, configured to capture an image of the at least one eye of the user, and obtain the eye movement information through image analysis (e.g., the position of the pupil in the eye socket).

In another example embodiment, the eye movement information capturing module, for example, may comprise an Electro-Oculogram (EOG) signal capturing module disposed on the at least one eye of the user. At this point, the eye movement information, for example, may be EOG information; or may be movement information of the at least one eye obtained according to the EOG information.

In one example embodiment, optionally, it is possible to capture the eye movement information at the side of the user equipment. For example, it is possible to capture an image of the at least one eye through an eye-facing camera on the user equipment.

In another example embodiment, optionally, S110 may further comprise: acquiring the eye movement information from at least one external device through a communication module. For example, the eye movement information is acquired from the user equipment or the wearable device described above.

S120: Adjust display of a display content of the user equipment at least according to a non-saccade eye movement part in the eye movement information.

In a process that the user observes an object daily, eye movement usually comprises three types:

saccade eye movement, eye movement in a process that the user's eye changes from one observed object to another observed object, characterized by great angular velocity and angular acceleration and visual processing suspension in the process;

fixation eye movement, an action of the corresponding eye when the user's eye observes an object stationary relative to the user (in the process, the user's eye is not moving, and in the example embodiment, the non-movement serves as a special example of movement); and smooth pursuit eye movement, movement of the eye in the process that the user's eye tracks and observes an objective moving relative to the user; compared with the saccade eye movement, the eye movement corresponding to the smooth pursuit eye movement is gentler.

Wherein, the fixation eye movement and the smooth pursuit eye movement are eye movement corresponding to that the user intentionally gazes an object.

Upon study, the inventor of the present application finds that, when a user gazes a user equipment, if his/her eye movement information comprises the fixation eye movement and/or the smooth pursuit eye movement described above, it indicates that the user is intentionally gazing an object on the user equipment. In the process, if the user equipment makes relative movement relative to the head of the user, this may be embodied in the user's eye movement information. Therefore, in the embodiment of the present application, adjustment of display of the display content corresponding to the relative movement is determined by using the non-saccade eye movement part in the eye movement information.

In one example embodiment, optionally, the non-saccade eye movement part comprises: a smooth pursuit eye movement part corresponding to the smooth pursuit eye movement in the eye movement information.

For example, in one possible application scenario, a user reads static display contents such as texts and images displayed on a display module of a user equipment, when the user is static relative to the user equipment, the user's eye movement information should only comprise a fixation eye movement part and a saccade eye movement part. Once the head of the user moves relative to the user equipment, the static display contents move relative to the head of the user, the original fixation eye movement part becomes a smooth pursuit eye movement part. Therefore, in one example embodiment, S120 can obtain relative movement information of the head of the user relative to the user equipment only according to the smooth pursuit eye movement part.

In another example embodiment, optionally, the non-saccade eye movement part comprises: a smooth pursuit eye movement part corresponding to the smooth pursuit eye movement in the eye movement information, and a fixation eye movement part corresponding to the fixation eye movement in the eye movement information.

For example, in one possible application scenario, the display module of the user equipment may display dynamic display contents such as video. Therefore, in a situation where the head of the user is static relative to the user equipment, the user's eye movement information may also comprise a smooth pursuit eye movement part, at this point, the relative movement information cannot be determined merely relying on the smooth pursuit eye movement part, but the relative movement information needs to be determined by using the smooth pursuit eye movement part and the fixation eye movement part at the same time.

In one example embodiment, optionally, the method may further comprise:

processing the eye movement information to obtain the non-saccade eye movement part.

For example, in another example embodiment, the eye movement information comprises eye rotation angular velocity information, and/or rotation amplitude information and the like; if the eye movement information is processed according to movement features corresponding to the eye movements described above, parts in the eye movement information which correspond to the eye movements can be determined.

In other example embodiments, for example, when the eye movement information comprises EOG information, it is also feasible to obtain EOG feature information corresponding to the eye movements according to pre-learning, and then after the EOG information is obtained, the non-saccade eye movement part in the eye movement information can be obtained by processing the EOG information according to the EOG feature information.

In one example embodiment, optionally, it is feasible to directly adjust the display according to the non-saccade eye movement part in the eye movement information. In another example embodiment, it is feasible to first determine relative movement information between the head of the user and the user equipment at least according to the non-saccade eye movement part; and then adjust display of the display content according to the relative movement information.

In one example embodiment, optionally, the determining relative movement information at least according to the non-saccade eye movement part comprises:

determining the relative movement information at least according to the non-saccade eye movement part and at least one reference non-saccade eye movement information.

The at least one reference non-saccade eye movement information, for example, may be: a non-saccade eye movement part in the eye movement information acquired by the user through a current gaze action in a condition of being static relative to the user equipment. For example, the user is reading texts displayed on the user equipment currently, for example, the user is reading a visual novel; the reference non-saccade eye movement information may be a non-saccade eye movement part in the eye movement information corresponding to the texts displayed on the user equipment read by the user in the static condition.

In one example embodiment, the determining the relative movement information at least according to the non-saccade eye movement part and at least one reference non-saccade eye movement information, for example, may comprise:

comparing the non-saccade eye movement part with reference non-saccade eye movement information in the at least one reference non-saccade eye movement information which corresponds to the eye movement information, to determine the relative movement information according to their difference.

In one possible scenario, for example, the user equipment is displaying a dynamic image currently, for example, the user equipment is playing a video, at this point, the user may gaze a moving object in the video. Therefore, in one example embodiment, optionally, the determining relative movement information at least according to the non-saccade eye movement part may further comprise:

determining the relative movement information at least according to the non-saccade eye movement part and content display information of the user equipment.

Herein, the content display information, for example, may be movement information of each object in the dynamic image. In one example embodiment, it is possible to determine an object watched by the user according to the eye movement information, and then determine eye movement information (having smooth pursuit eye movement corresponding to tracking the object) that the user should correspond to in a condition that the head of the user is static relative to the user equipment, and then obtain the relative movement information according to the difference between the non-saccade eye movement part and the eye movement information the user should correspond to.

Definitely, in one example embodiment, while the user watches a moving object, the object per se may also correspond to non-saccade reference eye movement information, and the determining relative movement information at least according to the non-saccade eye movement part may further comprise:

determining the relative movement information according to the non-saccade eye movement part, the content display information and the at least one reference non-saccade eye movement information.

For example, when the user reads text contents in a floating window on a webpage displayed by the user equipment, it is feasible to, after it is determined that the user is reading contents in the floating window, obtain the relative movement information according to the non-saccade eye movement part in the eye movement information, movement information of the floating window, and reference non-saccade eye movement information of the displayed texts read by the user.

In one example embodiment, optionally, the determining relative movement information at least according to the non-saccade eye movement part may further comprise:

determining the relative movement information at least according to the non-saccade eye movement part and movement information of the user equipment corresponding to the period corresponding to the non-saccade eye movement part.

In the example embodiment, determining the relative movement information on the basis of the non-saccade eye movement part in combination with the movement information of the user equipment can quickly and accurately eliminate effects brought about by the relative movement.

In the example embodiment, before the determining relative movement information at least according to the non-saccade eye movement part, the method may further comprise: acquiring the movement information.

Herein, the movement information, for example, may be at least one inertial sensing information of the user equipment, and it is feasible to acquire the information through at least one inertial sensor of the user equipment. The at least one inertial sensor, for example, may comprise at least one of the following:

at least one acceleration sensor, at least one gyroscope, at least one magnetic sensor, at least one gravity sensor and the like.

The movement information, for example, may comprise the at least one inertial sensing information captured by the at least one inertial sensor.

In one example embodiment, when the execution body of the display control method is located at the side of the user equipment, the acquiring the movement information may further comprise:

acquiring the movement information from at least one external device through communication.

The at least one external device, for example, may comprise the user equipment.

In one example embodiment, optionally, the determining the relative movement information at least according to the non-saccade eye movement part and movement information may comprise:

determining eye movement components of the non-saccade eye movement part corresponding to at least one movement feature of the movement information; and determining the relative movement information at least according to the eye movement components.

In one example embodiment, the at least one movement feature may comprise at least one of the following:

movement change frequency feature, movement change amplitude feature and movement change phase feature.

For example, in one example embodiment, optionally, the determining relative movement information at least according to the non-saccade eye movement part may comprise:

determining a part where eye movement information change frequencies in the non-saccade eye movement part match movement change frequency feature of the movement information; the difference between this part of the non-saccade eye movement part and eye movement information that the movement information should corresponding to is the corresponding part of the relative movement information.

Similarly, in one possible scenario, the user may also watch display contends dynamically displayed on the user equipment, at this point, it is also possible to combine the content display information to determine the relative movement information more accurately; therefore, in one example embodiment, the determining relative movement information at least according to the non-saccade eye movement part may further comprise: determining the relative movement information at least according to the non-saccade eye movement part, the content display information and movement information of the user equipment corresponding to the period corresponding to the non-saccade eye movement part.

According to the embodiment of the present application, through the example embodiments described above, it is feasible to determine relative movement information between the user and the user equipment more accurately, and the relative movement information can be configured to eliminate or reduce bad effects brought about by the relative movement on the user's reading the display content.

In one example embodiment, S120 may comprise: determining a display shifting parameter of the display content of the user equipment according to the non-saccade eye movement part; and displaying the display content according to the display shifting parameter;

wherein the display shifting parameter is configured to perform display stabilizing compensation on a relative movement between the head of the user and the user equipment corresponding to the non-saccade eye movement part.

Herein, the display shifting parameter, for example, may comprise: at least one of compensation speed, compensation time, and shifting amplitude.

In one example embodiment, for example, it is feasible to predict a relative movement rule between the user and the user equipment in a future period of time according to current relative movement information between the user and the user equipment, thus making corresponding compensation.

The example embodiment is further described through the following application scenario:

In one possible application scenario, a user uses a user equipment on a moving vehicle, wherein bumping movement x(t) of the vehicle is transferred to the user equipment and the head of the user respectively through different channels, causing their movements to be different, a movement rule of a display module of the user equipment is $y_D(t)$, and a movement rule of the head of the user is $y_H(t)$.

When static display contents such as texts and images of the display module of the user equipment are read, due to existence of relative movement between the display module and the head of the user, when the user reads the contents with the eye, their movement difference $y_D(t)-y_H(t)$ has to be compensated by the eye, causing the original fixation eye movement for the texts in the display contents to become frequent smooth pursuit eye movement w(t) at certain amplitude, and such additional smooth pursuit movement increases the burden of the eye, causing discomfort such as fatigue and dizziness.

To reduce the user's discomfort in reading, it is necessary to eliminate or reduce the movement difference $y_D(t)-y_H(t)$ through an image stabilizing technology, to eliminate or reduce the additional smooth pursuit eye movement, for example, to try to achieve an effect of w(t)=0.

In one example embodiment, the method of eliminating the movement difference $y_D(t)-y_H(t)$ comprises:

adding compensation movement corresponding to the movement difference $y_D(t)-y_H(t)$ to the display content displayed by the display module, to cause movement of the display content relative to the head of the user to be 0.

Figure 2:
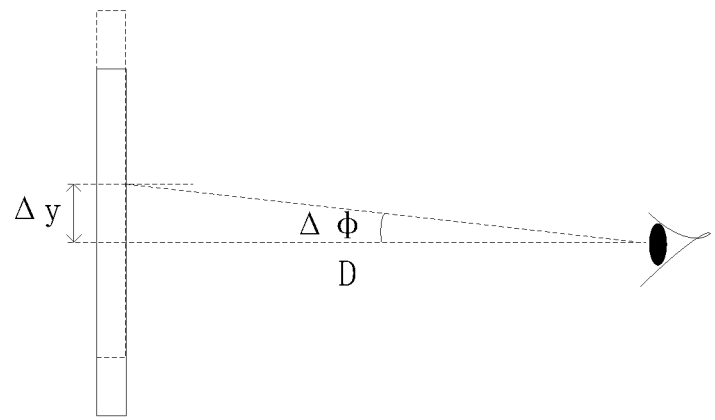
FIG. 2 is a schematic application diagram of a display control method according to an example embodiment of the present application.

For example, generally, when a user reads a mobile phone, the eye is at a distance about 25 cm to 50 cm from the screen; the amplitude of relative shaking of the mobile phone at which uncomfortable reading is caused is generally within 0.2-3 cm. By taking the vertical direction of reading as example, as shown in FIG. 2, when bumping occurs during reading, if a gaze point moves a distance of Δy relative to a human eye, the view variation Δφ caused by the gaze point of human eye pursuit shake is:

$$\Delta\varphi \approx \Delta y/D \quad (1)$$

wherein D is a distance from the eye to the gaze point.

The distance D from the eye to the screen during reading is regarded as a constant, and by calculating a derivative of time for two sides of the formula (1), the following formula can be obtained:

$$\omega = Dv \quad (2)$$

wherein ω is angular velocity during smooth pursuit eye movement of an eyeball, and v is linear velocity of the gaze point corresponding to the eye; it is thus clear that, when the eyeball has angular velocity corresponding to the smooth pursuit eye movement in a certain direction, the compensation velocity $v_D$ of the desired screen display content is:

$$v_D \approx \omega/D \quad (3)$$

For example, in one example embodiment, it is feasible to determine compensation for the display content at the time of k+1 through smooth pursuit eye movement information of the user acquired at the time of k:

1) in the beginning: compensation speeds in horizontal and vertical directions of the display content are both set as 0, that is, $v_{DH}(t|0)=0; v_{DV}(t|0)=0$ 2) if horizontal and vertical components of smooth pursuit detected at the time of k are respectively $\omega_H(t|k)$, $\omega_V(t|k)$;
the compensation speeds in horizontal and vertical directions at the time of k+1 are respectively updated as:

$v_{DH}(t|k+1)=v_{DH}(t|k)-\omega_H(t|k)/D;$ $v_{DV}(t|k+1)=v_{DV}(t|k)-\omega_V(t|k)/D;$ 3) if no smooth pursuit is detected at the time of k, $v_{DH}(t|k+1)=v_{DH}(t|k);$ $v_{DV}(t|k+1)=v_{DV}(t|k);$ The above is merely one example embodiment of adjustment of the content display; those skilled in the art can know that the manner of adjusting other parameters of the content display to eliminate or reduce the bad effects can also be applied to the embodiment of the present application, for example, in one example embodiment, relative movement corresponding to the relative movement information comprises changes of a relative angle, for example, a relative elevation angle changes, and at this point, it is also feasible to adjust a display perspective parameter of the display content.

Those skilled in the art can see that, through the above adjustment, it is feasible to make the display content watched by the user rest or move less relative to the user when the head of the user makes relative movement relative to the user equipment, causing the user to feel more comfortable and tireless when watching the display content.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 3:
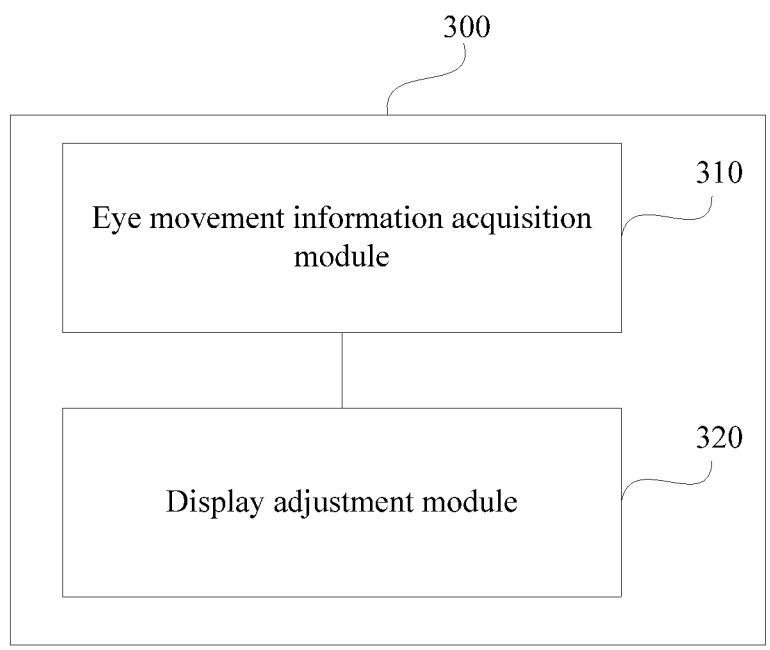
FIG. 3 is a schematic structural diagram of a display control apparatus according to an example embodiment of the present application.

As shown in FIG. 3, one example embodiment of the present application provides a display control apparatus 300, comprising:

an eye movement information acquisition module 310, configured to acquire eye movement information related to that at least one eye of a user gazes a user equipment; and a display adjustment module 320, configured to adjust display of a display content of the user equipment at least according to a non-saccade eye movement part in the eye movement information.

According to the example embodiment of the present application, a display content of a user equipment is adjusted according to a non-saccade eye movement part of the user equipment gazed by a user, to enable relative movement between the head of the user and the adjusted display content to disappear or decrease, thus improving the user's reading experience in a scenario of having relative movement with the user equipment.

Modules and units of the embodiment of the present application are further described through the following example embodiment.

In the embodiment of the present application, the at least one eye may be one eye of the user; or may also be two eyes of the user.

In one example embodiment, the eye movement information comprises first movement information related to movement of the at least one eye in a corresponding eye socket.

In another example embodiment, in addition to the first movement information, the eye movement information may further comprise second movement information related to movement of the head of the user.

Figure 4A:
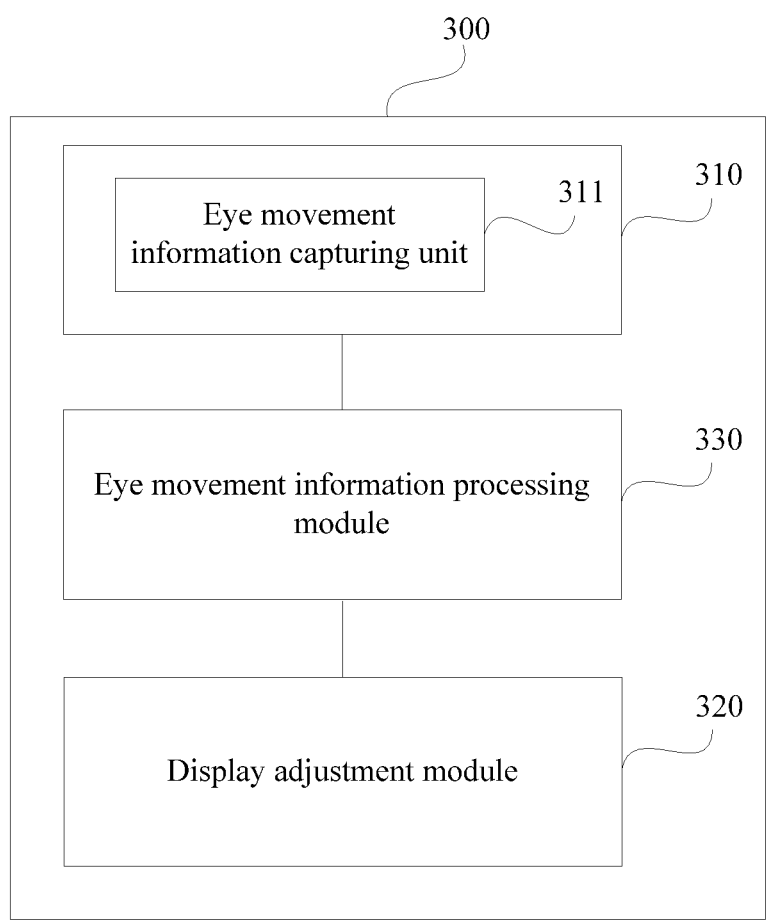
FIGS. 4a-4g are schematic structural diagrams of seven display control apparatuses according to an example embodiment of the present application.

As shown in FIG. 4a, in one example embodiment, optionally, the eye movement information acquisition module 310 comprises: an eye movement information capturing unit 311, configured to capture the eye movement information.

In another example embodiment, optionally, the eye movement information acquisition module 310 comprises: a communication unit, configured to acquire the eye movement information from at least one external device.

Upon study, the inventor of the present application finds that, when a user gazes a user equipment, if his/her eye movement information comprises the fixation eye movement and the smooth pursuit eye movement described above, it indicates that the user is intentionally gazing an object on the user equipment. In the process, if the user equipment makes relative movement relative to the head of the user, this may be embodied in the user's eye movement information. Therefore, in the embodiment of the present application, adjustment of display of the display content corresponding to the relative movement is determined by using the non-saccade eye movement part in the eye movement information.

As shown in FIG. 4a, in one example embodiment, optionally, the apparatus 300 may further comprise:

an eye movement information processing module 330, configured to process the eye movement information to obtain the non-saccade eye movement part.

As described in the embodiment shown in FIG. 1, in one example embodiment, the non-saccade eye movement part may comprise: a smooth pursuit eye movement part. In another example embodiment, the non-saccade eye movement part may further comprise: a fixation eye movement part.

In one example embodiment, optionally, the display adjustment module 320 may directly adjust the display according to the non-saccade eye movement part in the eye movement information.

Figure 4B:
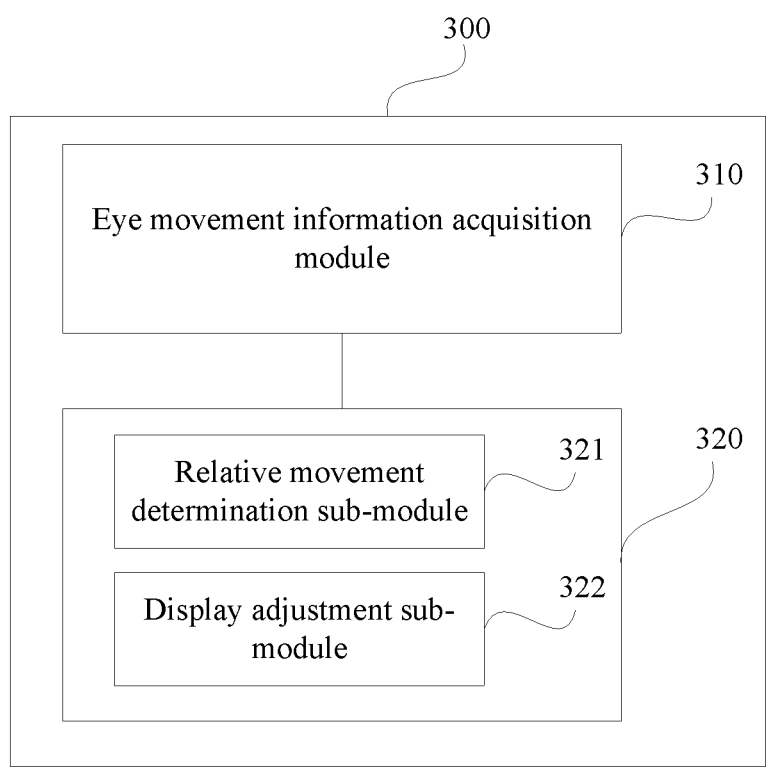

In another example embodiment, as shown in FIG. 4b, optionally, the display adjustment module 320 may comprise:

a relative movement determination sub-module 321, configured to determine relative movement information between the head of the user and the user equipment at least according to the non-saccade eye movement part; and a display adjustment sub-module 322, configured to adjust display of the display content according to the relative movement information.

Figure 4C:
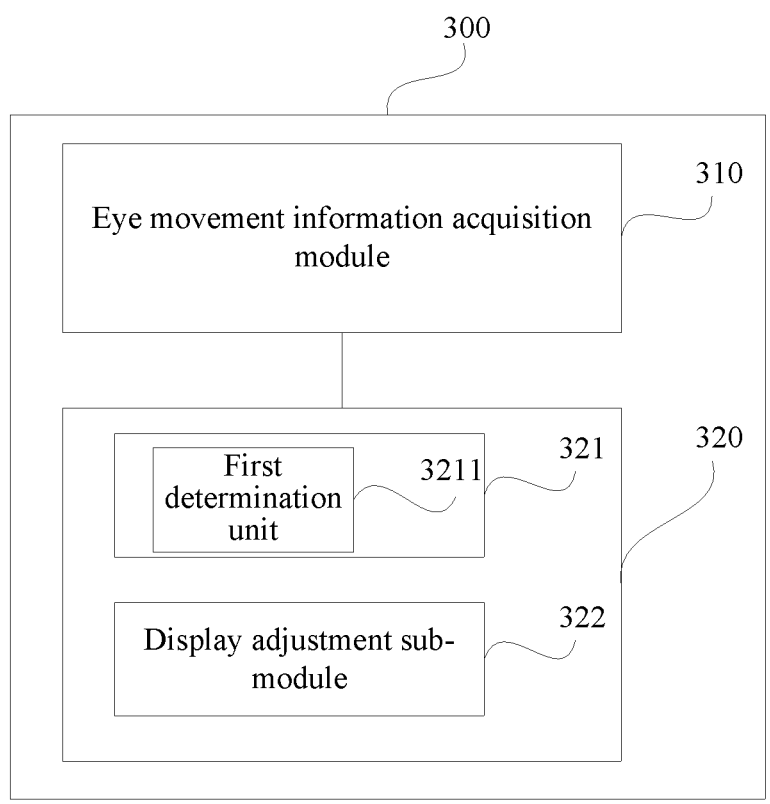

As shown in FIG. 4c, in one example embodiment, the relative movement determination sub-module 321 comprises:

a first determination unit 3211, configured to determine the relative movement information at least according to the non-saccade eye movement part and at least one reference non-saccade eye movement information.

The at least one reference non-saccade eye movement information, for example, may be: a non-saccade eye movement part in the eye movement information acquired by the user through a current gaze action in a condition of being static relative to the user equipment.

In one example embodiment, the first determination unit 321 may be further configured to:

compare the non-saccade eye movement part with reference non-saccade eye movement information in the at least one reference non-saccade eye movement information which corresponds to the eye movement information, to determine the relative movement information according to their difference.

Figure 4D:
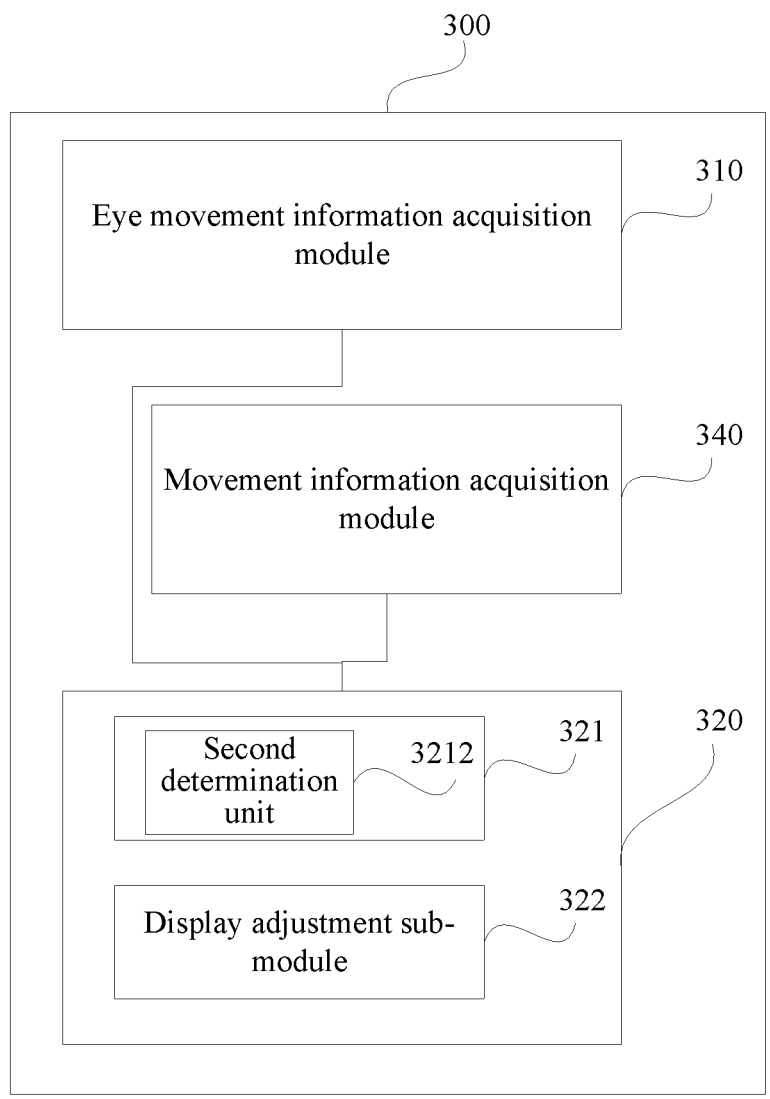

As shown in FIG. 4d, in one example embodiment, the relative movement determination sub-module 321 may comprise:

a second determination unit 3212, configured to determine the relative movement information at least according to the non-saccade eye movement part and movement information of the user equipment corresponding to the period corresponding to the non-saccade eye movement part.

In the example embodiment, optionally, the apparatus 300 further comprises: a movement information acquisition module 340, configured to acquire the movement information.

Herein, the movement information, for example, may be at least one inertial sensing information of the user equipment, and it is feasible to acquire the information through at least one inertial sensor of the user equipment. The at least one inertial sensor, for example, may comprise at least one of the following:

at least one acceleration sensor, at least one gyroscope, at least one magnetic sensor, at least one gravity sensor and the like.

The movement information, for example, may comprise the at least one inertial sensing information captured by the at least one inertial sensor.

In one example embodiment, when the movement information acquisition module 340 is located at the side of the user equipment, the movement information acquisition module 340, for example, may further comprise:

the at least one inertial sensor, configured to acquire the movement information.

In another example embodiment, for example, when the movement information acquisition module 340 is not at the side of the user equipment, the movement information acquisition module 340 may further comprise:

a communication unit, configured to acquire the movement information from at least one external device through communication.

Herein, the at least one external device, for example, may comprise the user equipment.

Figure 4E:
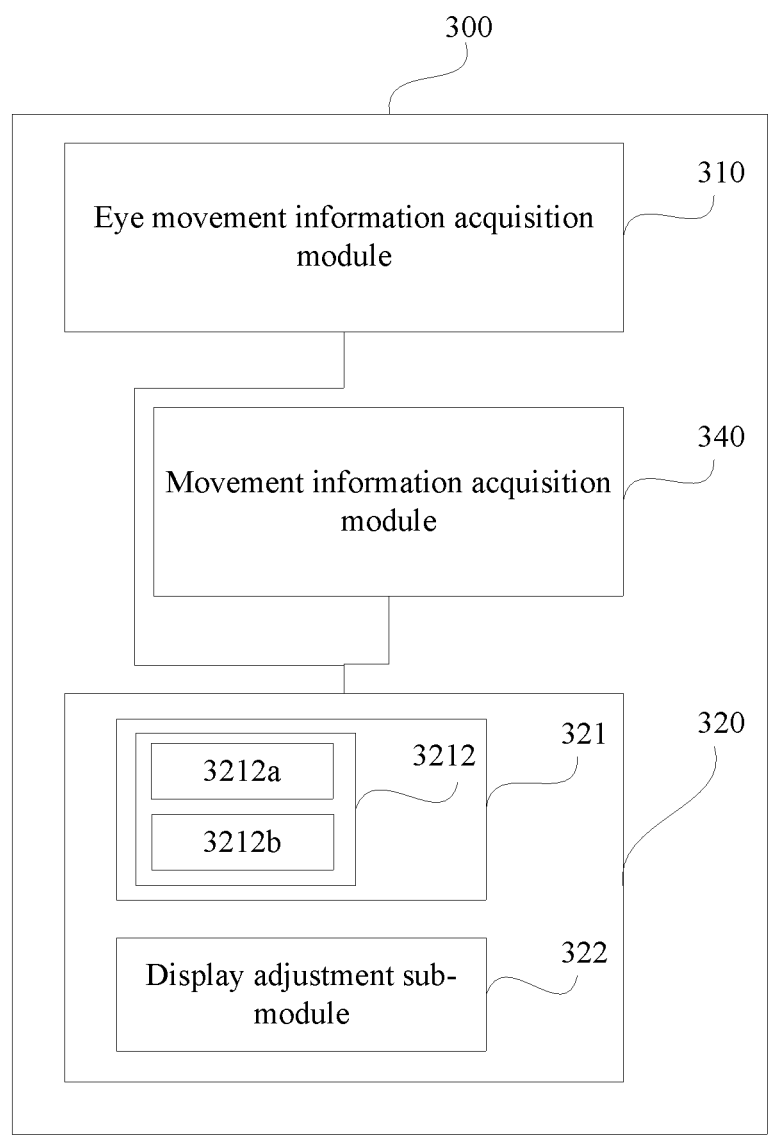

As shown in FIG. 4e, in one example embodiment, optionally, the second determination unit 3212 may comprise:

a first determination sub-unit 3212a, configured to determine eye movement components of the non-saccade eye movement part corresponding to at least one movement feature of the movement information; and a second determination sub-unit 3212b, configured to determine the relative movement information at least according to the eye movement components.

In one example embodiment, the at least one movement feature may comprise at least one of the following:

movement change frequency feature, movement change amplitude feature and movement change phase feature.

Figure 4F:
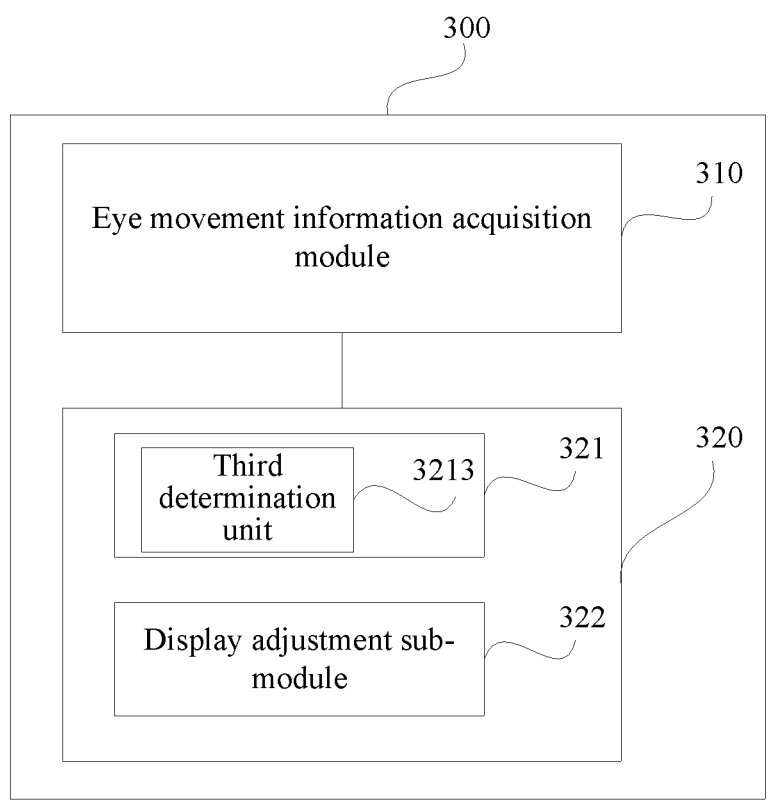

In one possible scenario, for example, the user equipment is displaying a dynamic image currently, for example, the user equipment is playing a video, at this point, the user may gaze a moving object in the video. Therefore, in one example embodiment, optionally, as shown in FIG. 4f, the relative movement determination sub-module 321 may comprise:

a third determination unit 3213, configured to determine the relative movement information at least according to the non-saccade eye movement part and content display information of the user equipment.

Herein, the content display information, for example, may be movement information of each object in the dynamic image.

Definitely, in one example embodiment, while the user watches a moving object, the object per se may also correspond to non-saccade reference eye movement information; at this point, the third determination unit 3213 may further determine the relative movement information according to the non-saccade eye movement part, the content display information and the at least one reference non-saccade eye movement information.

In another example embodiment, optionally, the third determination unit 3213 may further determine the relative movement information according to the non-saccade eye movement part, the content display information and movement information of the user equipment corresponding to the period corresponding to the non-saccade eye movement part According to the embodiment of the present application, through the above example embodiments, it is feasible to determine relative movement information between the user and the user equipment more accurately, and the relative movement information may be applied to multiple aspects, bringing about better user experience to the user. For example, it is feasible to predict a relative movement rule between the user and the user equipment in a future period of time according to current relative movement information between the user and the user equipment, thus making corresponding compensation.

Figure 4G:
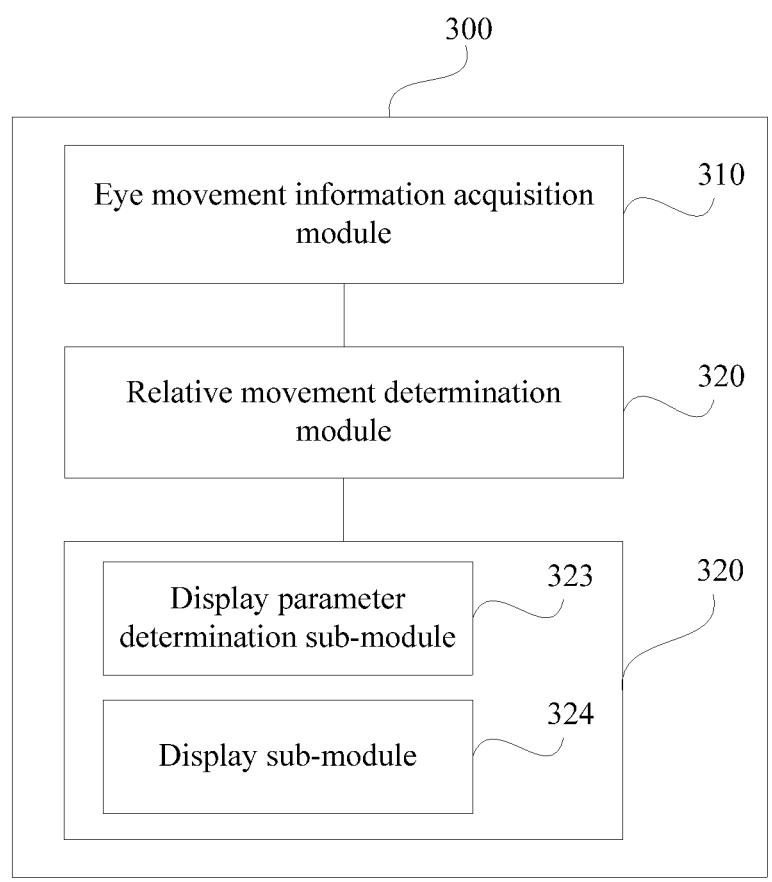

For example, as shown in FIG. 4g, in one example embodiment, the display adjustment module 320 comprises:

a display parameter determination sub-module 323, configured to determine a display shifting parameter of the display content of the user equipment according to the non-saccade eye movement part; and a display sub-module 324, configured to display the display content according to the display shifting parameter;

wherein the display shifting parameter is configured to perform display stabilizing compensation on a relative movement corresponding to the non-saccade eye movement part.

Herein, the display shifting parameter, for example, may comprise: at least one of compensation speed, compensation time, and shifting amplitude.

For example, it is determined according to the non-saccade eye movement part that the user equipment moves upwards at a first speed relative to the head of the user, and the display content can move downwards at the first speed, thus keeping the display content and the head of the user static.

Figure 5:
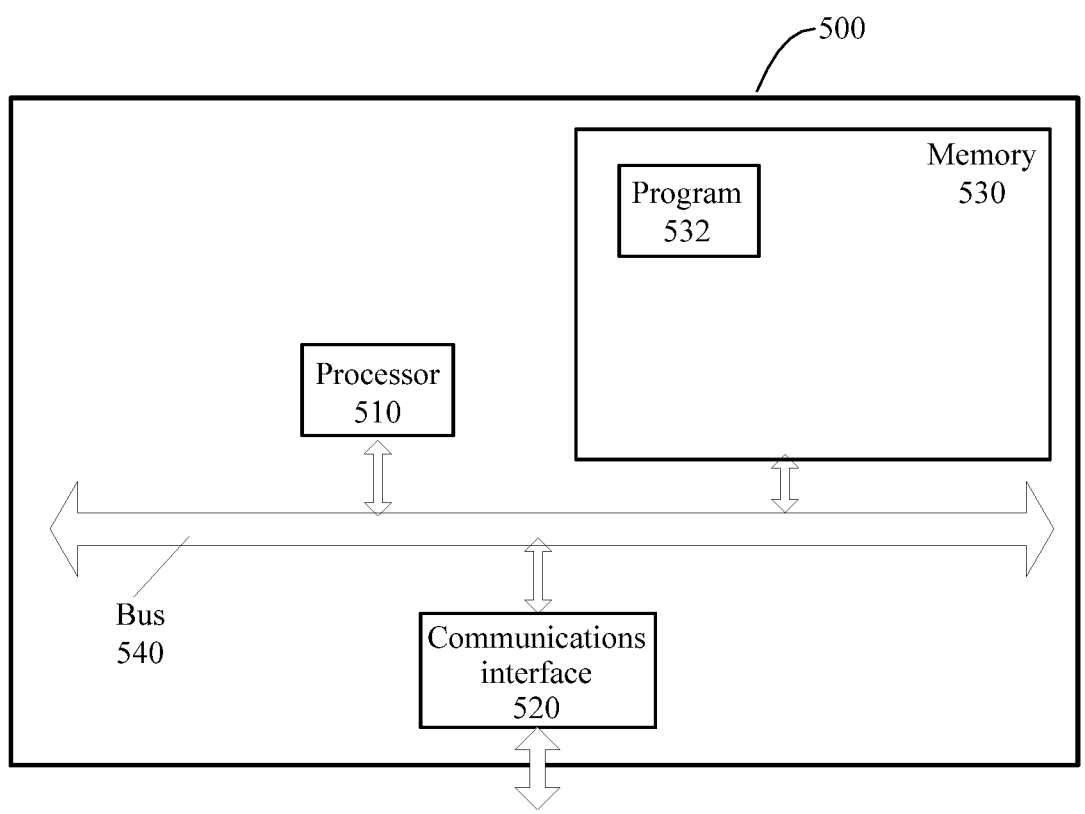
FIG. 5 is a schematic structural diagram of a user equipment according to an example embodiment of the present application.

FIG. 5 is a schematic structural diagram of a user equipment 500 according to an embodiment of the present application; the specific embodiment of the present application does not limit an example embodiment of the user equipment 500. As shown in FIG. 5, the user equipment 500 may comprise:

a processor 510, a communications interface 520, a memory 530, and a communications bus 540.

The processor 510, the communications interface 520, and the memory 530 communicate with each other via the communications bus 540.

The communications interface 520 is configured to communicate with, for example, a network element such as a client.

The processor 510 is configured to run a program 532, and specifically can perform the related steps in the foregoing method embodiments.

For example, the program 532 may comprise program code, where the program code comprises a computer operating instruction.

The processor 510 may be a central processing unit (CPU), or an application specific integrated circuit (ASIC), or one or more integrated circuits configured to implement the embodiments of the present application.

The memory 530 is configured to store the program 532. The memory 530 may comprise a random access memory (RAM), or further comprise a non-volatile memory, for example, at least one magnetic disk memory. The program 532 can be specifically configured to cause the user equipment 500 to perform the following operations of:

acquiring eye movement information related to that at least one eye of a user gazes the user equipment; and adjusting display of a display content of the user equipment at least according to a non-saccade eye movement part in the eye movement information.

Alternatively, in another example embodiment, the program 532 can be specifically configured to cause the user equipment 500 to perform the following operations of:

acquiring eye movement information related to that at least one eye of a user gazes another user equipment; and adjusting display of a display content of the other user equipment at least according to a non-saccade eye movement part in the eye movement information.

For the specific implementation of the steps in the program 532, reference may be made to the corresponding descriptions in the corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, which are not described herein again.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be defined by the claims.

What is claimed is:

1. A method, comprising:

acquiring, by a system comprising a processor, eye movement information related to determining that an eye of a user gazes at user equipment, wherein the eye movement information is Electro-Oculogram (EOG) information;

processing, by the system, the eye movement information which comprises a saccade eye movement part and a non-saccade eye movement part according to pre-learned EOG feature information associated with eye movements, to obtain the non-saccade eye movement part, wherein:

the saccade eye movement part corresponds to a process of the eye changing from one observed object to another observed object;

the non-saccade eye movement part comprises:

a smooth pursuit eye movement part that corresponds to a movement of the eye tracking and observing an object moving relative to the user, a fixation eye movement part that corresponds to an action of the eye observing an object stationary relative to the user, or both the smooth pursuit eye movement part and the fixation eye movement part; and the fixation eye movement part and the smooth pursuit eye movement part are eye movement parts corresponding to that the user intentionally gazes the object; and adjusting, by the system, a display of a display content of the user equipment at least according to the non-saccade eye movement part of the eye movement information, wherein the adjusting the display of the display content of the user equipment at least according to the non-saccade eye movement part comprises:

determining relative movement information between a head of the user and the user equipment at least according to the non-saccade eye movement part; and adjusting the display of the display content according to the relative movement information, wherein the determining the relative movement information at least according to the non-saccade eye movement part comprises:

determining the relative movement information at least according to the non-saccade eye movement part and movement information of the user equipment corresponding to a period corresponding to the non-saccade eye movement part, wherein the determining the relative movement information at least according to the non-saccade eye movement part and the movement information comprises:

determining eye movement components of the non-saccade eye movement part corresponding to a movement feature of the movement information, comprising:
  determining a part where eye movement information change frequencies in the non-saccade eye movement part match movement change frequency feature of the movement information; and
  determining the relative movement information at least according to the eye movement components, wherein the movement feature comprises at least one of: a movement change frequency feature, a movement change amplitude feature or a movement change phase feature wherein the relative movement information comprises a difference between the part of the non-saccade eye movement part and eye movement information corresponding to the movement change frequency feature of the movement information.

2. The method of claim 1, wherein the adjusting the display of the display content of the user equipment at least according to the non-saccade eye movement part further comprises:
  determining a display shifting parameter of the display content of the user equipment at least according to the non-saccade eye movement part; and
  displaying the display content according to the display shifting parameter, wherein the display shifting parameter is configured to perform display stabilizing compensation on a relative movement between the head of the user and the user equipment corresponding to the non-saccade eye movement part.

3. The method of claim 1, wherein the determining the relative movement information at least according to the non-saccade eye movement part further comprises:
  determining the relative movement information at least according to the non-saccade eye movement part and at least one reference to non-saccade eye movement information.

4. The method of claim 1, further comprising:
  before the determining the relative movement information at least according to the non-saccade eye movement part, acquiring the movement information.

5. The method of claim 1, wherein the determining the relative movement information at least according to the non-saccade eye movement part further comprises:
  determining the relative movement information at least according to the non-saccade eye movement part and content display information of the user equipment.

6. The method of claim 1, wherein the adjusting the display further comprises:
  in response to determining a display shifting parameter of the display content according to the non-saccade eye movement part, displaying the display content according to the display shifting parameter, wherein the display shifting parameter enables display stabilizing compensation of a relative movement corresponding to the non-saccade eye movement part.

7. The method of claim 1, wherein the adjusting the display further comprises:
  in response to determining the relative movement information between the head of the user and the user equipment at least according to the non-saccade eye movement part, adjusting the display of the display content according to the relative movement information.

8. An apparatus, comprising:
a memory that stores executable modules; and
a processor, coupled to the memory, that executes or facilitates execution of the executable modules, the executable modules comprising:
  an eye movement information acquisition module configured to acquire eye movement information related to a determination that at least one eye of a user is gazing at user equipment, wherein the eye movement information is Electro-Oculogram (EOG) information;
  an eye movement information processing module configured to process the eye movement information which comprises a saccade eye movement part and a non-saccade eye movement part according to pre-learned EOG feature information associated with eye movements, to obtain the non-saccade eye movement part, wherein:
    the saccade eye movement part corresponds to a process of the at least one eye changing from one observed object to another observed object;
    the non-saccade eye movement part comprises at least one of:
      a smooth pursuit eye movement part that corresponds to a movement of the at least one eye tracking and observing an object moving relative to the user, or
      a fixation eye movement part that corresponds to an action of the at least one eye observing an object stationary relative to the user; and
    the fixation eye movement part and the smooth pursuit eye movement part are eye movement parts corresponding to that the user intentionally gazes the object; and
  a display adjustment module configured to adjust a display of a display content of the user equipment at least according to the non-saccade eye movement part in the eye movement information, wherein the display adjustment module comprises:
    a relative movement determination sub-module configured to determine relative movement information between a head of the user and the user equipment at least according to the non-saccade eye movement part; and
    a display adjustment sub-module configured to adjust the display of the display content according to the relative movement information, wherein the relative movement determination sub-module comprises:
      a determination unit configured to determine the relative movement information at least according to the non-saccade eye movement part and movement information of the user equipment corresponding to a period corresponding to the non-saccade eye movement part, wherein the determination unit comprises:
        a first determination sub-unit configured to determine eye movement components of the non-saccade eye movement part corresponding to a movement feature of the movement information, comprising:
          determining a part where eye movement information change frequencies in the non-saccade eye movement part match movement change frequency feature of the movement information; and
a second determination sub-unit configured to determine the relative movement information at least according to the eye movement components, wherein the movement feature comprises at least one of: a movement change frequency feature, a movement change amplitude feature or a movement change phase feature, wherein the relative movement information comprises a difference between the part of the non-saccade eye movement part and eye movement information corresponding to the movement change frequency feature of the movement information.

9. The apparatus of claim 8, wherein the display adjustment module further comprises:
a display parameter determination sub-module configured to determine a display shifting parameter of the display content of the user equipment according to the non-saccade eye movement part; and
a display sub-module configured to display the display content according to the display shifting parameter, wherein the display shifting parameter is configured to perform display stabilizing compensation on a relative movement corresponding to the non-saccade eye movement part.

10. The apparatus of claim 8, wherein the determination unit is further configured to determine the relative movement information at least according to the non-saccade eye movement part and at least one reference to non-saccade eye movement information.

11. The apparatus of claim 8, wherein the executable modules further comprise:
a movement information acquisition module configured to acquire the movement information.

12. The apparatus of claim 8, wherein the determination unit is further configured to determine the relative movement information at least according to the non-saccade eye movement part and content display information of the user equipment.

13. The apparatus of claim 8, wherein the display adjustment sub-module is further configured to:
in response to a determination of a display shifting parameter of the display content according to the non-saccade eye movement part, display the display content according to the display shifting parameter, wherein the display shifting parameter enables display stabilizing compensation of a relative movement corresponding to the non-saccade eye movement part.

14. The apparatus of claim 8, wherein the display adjustment sub-module is further configured to:
in response to a determination of the relative movement information between the head of the user and the user equipment at least according to the non-saccade eye movement part, adjust the display of the display content according to the relative movement information.

15. A user equipment, comprising:
a user interface configured for display;
a memory configured to store a program; and
a processor configured to execute the program stored by the memory, the program causing the processor to perform operations, comprising:
acquiring eye movement information related to a determination that an eye of a user gazes at the user equipment, wherein the eye movement information is Electro-Oculogram (EOG) information;
processing the eye movement information which comprises a saccade eye movement part and a non-saccade eye movement part according to pre-learned EOG feature information associated with eye movements, to obtain the non-saccade eye movement part, wherein:
the saccade eye movement part corresponds to a process of the eye changing from one observed object to another observed object;
the non-saccade eye movement part comprises:
a smooth pursuit eye movement part that corresponds to a movement of the eye tracking and observing an object moving relative to the user,
a fixation eye movement part that corresponds to an action of the eye observing an object stationary relative to the user, or
the smooth pursuit eye movement part and the fixation eye movement part; and
the fixation eye movement part and the smooth pursuit eye movement part are eye movement parts corresponding to that the user intentionally gazes the object; and
adjusting the display of a display content of the user equipment at least according to the non-saccade eye movement part in the eye movement information, wherein the adjusting the display of the display content of the user equipment at least according to the non-saccade eye movement part comprises:
determining relative movement information between a head of the user and the user equipment at least according to the non-saccade eye movement part; and
adjusting the display of the display content according to the relative movement information, wherein the determining the relative movement information at least according to the non-saccade eye movement part comprises:
determining the relative movement information at least according to the non-saccade eye movement part and movement information of the user equipment corresponding to a period corresponding to the non-saccade eye movement part, wherein the determining the relative movement information at least according to the non-saccade eye movement part and the movement information comprises:
determining eye movement components of the non-saccade eye movement part corresponding to a movement feature of the movement information, comprising:
determining a part where eye movement information change frequencies in the non-saccade eye movement part match movement change frequency feature of the movement information; and
determining the relative movement information at least according to the eye movement components, wherein the movement feature comprises at least one of: a movement change frequency feature, a movement change amplitude feature or a movement change phase feature, wherein the relative movement information comprises a difference between the part of the non-saccade eye movement part and eye movement information corresponding to the movement change frequency feature of the movement information.

16. The user equipment of claim 15, wherein the adjusting the display further comprises:
in response to determining a display shifting parameter of the display content according to the non-saccade eye movement part, displaying the display content according to the display shifting parameter, wherein the display shifting parameter enables display stabilizing compensation of a relative movement corresponding to the non-saccade eye movement part.

17. The user equipment of claim 15, wherein the adjusting the display further comprises:
in response to determining the relative movement information between the head of the user and the user equipment at least according to the non-saccade eye movement part, adjusting the display of the display content according to the relative movement information.

18. The user equipment of claim 17, wherein the determining the relative movement information further comprises:
determining the relative movement information at least according to the non-saccade eye movement part and at least one reference to non-saccade eye movement information.

19. The user equipment of claim 15, the operations further comprising:
before the determining the relative movement information at least according to the non-saccade eye movement part, acquiring the movement information.

20. The user equipment of claim 15, wherein the determining the relative movement information at least according to the non-saccade eye movement part further comprises:
determining the relative movement information at least according to the non-saccade eye movement part and content display information of the user equipment.

21. A user equipment, comprising:
a memory configured to store a program; and
a processor configured to execute the program stored by the memory, the program causing the processor to perform operations, comprising:
acquiring eye movement information related to that at least one eye of a user gazes another user equipment, wherein the eye movement information is Electro-Oculogram (EOG) information;
processing the eye movement information which comprises a saccade eye movement part and a non-saccade eye movement part according to pre-learned EOG feature information associated with eye movements, to obtain the non-saccade eye movement part, wherein:
the saccade eye movement part corresponds to a process of the at least one eye changing from one observed object to another observed object;
the non-saccade eye movement part comprises:
a smooth pursuit eye movement part that corresponds to a movement of the at least one eye tracking and observing an object moving relative to the user,
a fixation eye movement part that corresponds to an action of the at least one eye observing an object stationary relative to the user, or
the smooth pursuit eye movement part and the fixation eye movement part; and
wherein, the fixation eye movement part and the smooth pursuit eye movement part are eye movement parts corresponding to that the user intentionally gazes the object; and
adjusting a display of a display content of the user equipment at least according to the non-saccade eye movement part in the eye movement information, wherein the adjusting the display of the display content of the user equipment at least according to the non-saccade eye movement part comprises:
determining relative movement information between a head of the user and the user equipment at least according to the non-saccade eye movement part; and
adjusting the display of the display content according to the relative movement information, wherein the determining the relative movement information at least according to the non-saccade eye movement part comprises:
determining the relative movement information at least according to the non-saccade eye movement part and movement information of the user equipment corresponding to a period corresponding to the non-saccade eye movement part, wherein the determining the relative movement information at least according to the non-saccade eye movement part and the movement information comprises:
determining eye movement components of the non-saccade eye movement part corresponding to a movement feature of the movement information, comprising:
determining a part where eye movement information change frequencies in the non-saccade eye movement part match movement change frequency feature of the movement information; and
determining the relative movement information at least according to the eye movement components, wherein the movement feature comprises at least one of: a movement change frequency feature, a movement change amplitude feature or a movement change phase feature wherein the relative movement information comprises a difference between the part of the non-saccade eye movement part and eye movement information corresponding to the movement change frequency feature of the movement information.

22. The user equipment of claim 21, wherein the adjusting the display further comprises:
determining a display shifting parameter of the display content according to the non-saccade eye movement part; and
displaying the display content according to the display shifting parameter, wherein the display shifting parameter enables display stabilizing compensation of a relative movement corresponding to the non-saccade eye movement part.

23. The user equipment of claim 21, wherein the adjusting the display further comprises:
determining the relative movement information between the head of the user and the user equipment at least according to the non-saccade eye movement part; and
adjusting the display of the display content according to the relative movement information.

24. The user equipment of claim 23, wherein the determining the relative movement information further comprises:
   determining the relative movement information at least according to the non-saccade eye movement part and at least one reference to non-saccade eye movement information.

25. The user equipment of claim 21, the operations further comprising:
   before the determining the relative movement information at least according to the non-saccade eye movement part, acquiring the movement information.

26. The user equipment of claim 21, wherein the determining the relative movement information at least according to the non-saccade eye movement part further comprises:
   determining the relative movement information at least according to the non-saccade eye movement part and content display information of the user equipment.

* * * * *